United States Patent

Horn et al.

Patent Number: 6,105,490
Date of Patent: Aug. 22, 2000

[54] APPARATUS FOR MARINATING MEAT PRODUCTS

[76] Inventors: Darrell Horn; John Lennox, both of P.O. Box 3109, Rohnert Park, Calif. 94927

[21] Appl. No.: 09/366,181

[22] Filed: Aug. 3, 1999

Related U.S. Application Data

[60] Provisional application No. 60/095,183, Aug. 3, 1998.

[51] Int. Cl.$^7$ .............................. A23L 1/00; A23L 1/31; B01F 13/06; B01F 15/06
[52] U.S. Cl. ............................. 99/472; 99/534; 99/517; 366/139; 366/149; 366/147
[58] Field of Search ..................... 366/139, 144, 366/147, 149; 99/348, 472, 470, 534, 517

[56] References Cited

U.S. PATENT DOCUMENTS

| | | | |
|---|---|---|---|
| 2,753,158 | 7/1956 | Rebechini | 366/139 |
| 4,432,650 | 2/1984 | Langen et al. | 366/147 |
| 4,498,378 | 2/1985 | Norrie et al. | 366/139 |
| 4,517,888 | 5/1985 | Gould | 366/139 |
| 4,522,118 | 6/1985 | Simonsen et al. | 366/139 |
| 5,218,898 | 6/1993 | Norris | 99/472 |
| 5,284,085 | 2/1994 | Palm | 366/139 |
| 5,323,694 | 6/1994 | Hagashimoto | 366/139 |
| 5,564,332 | 10/1996 | Ludwig | 366/139 |
| 5,947,015 | 9/1999 | Laurbak | 366/139 |

*Primary Examiner*—Tony G. Soohoo
*Attorney, Agent, or Firm*—Larry D. Johnson

[57] ABSTRACT

A vacuum meat marinating machine for products requiring a short vacuum massage cycle, comprising a substantially horizontal cylindrical vessel having a large opening at the top for rapid loading of product, said opening covered by a sealed vacuum cover during operation, and further having a hollow outer wall comprising a jacket for the circulation of liquid refrigerant. A paddle agitator is located within the vessel, having a hollow shaft running longitudinally within the vessel. Affixed at an angle to the shaft are a plurality of hollow triangular-shaped paddles, which paddles push product horizontally during operation. Liquid refrigerant circulates through the hollow wall of the vessel, as well as the hollow agitator shaft and paddles. The agitator shaft is connected to a reversible motor that periodically reverses the direction of rotation, thereby maximizing heat exchange between product and liquid refrigerant.

20 Claims, 2 Drawing Sheets

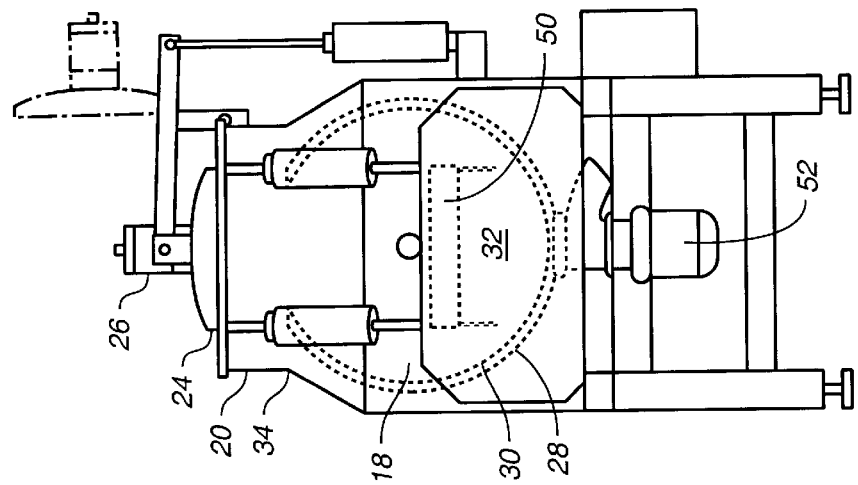
FIG._2
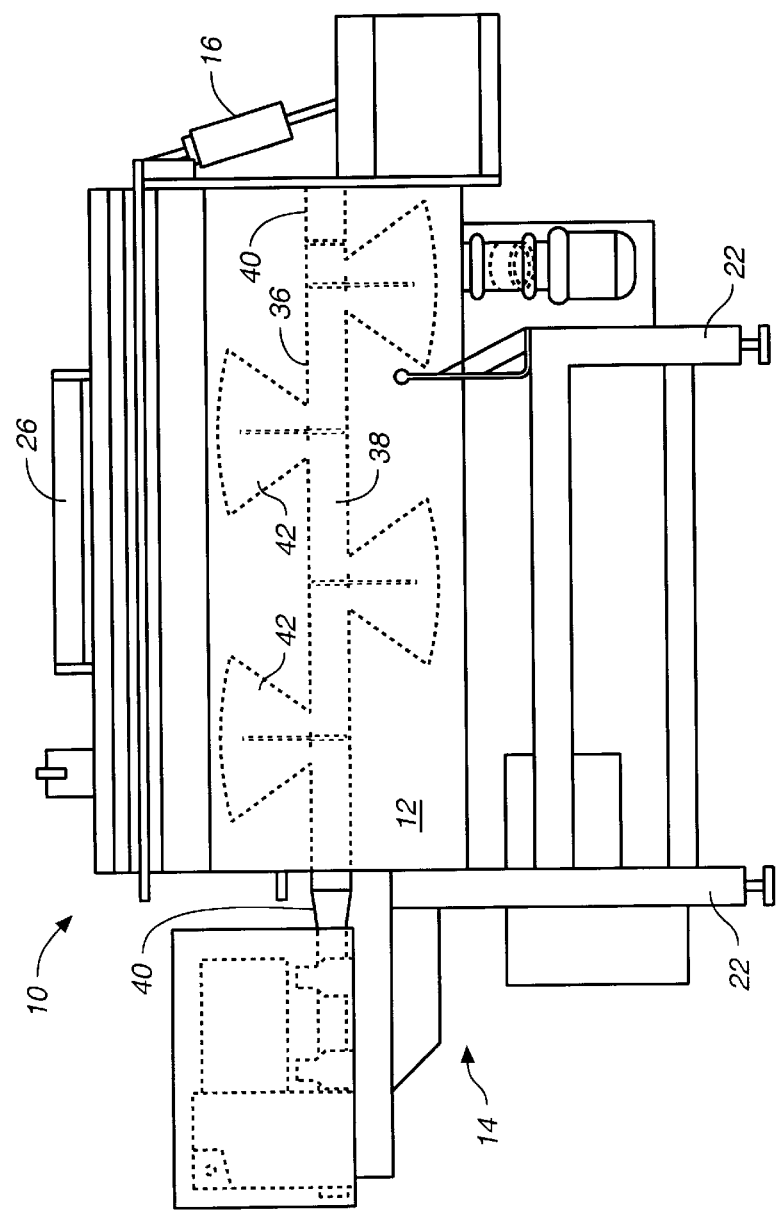
FIG._1

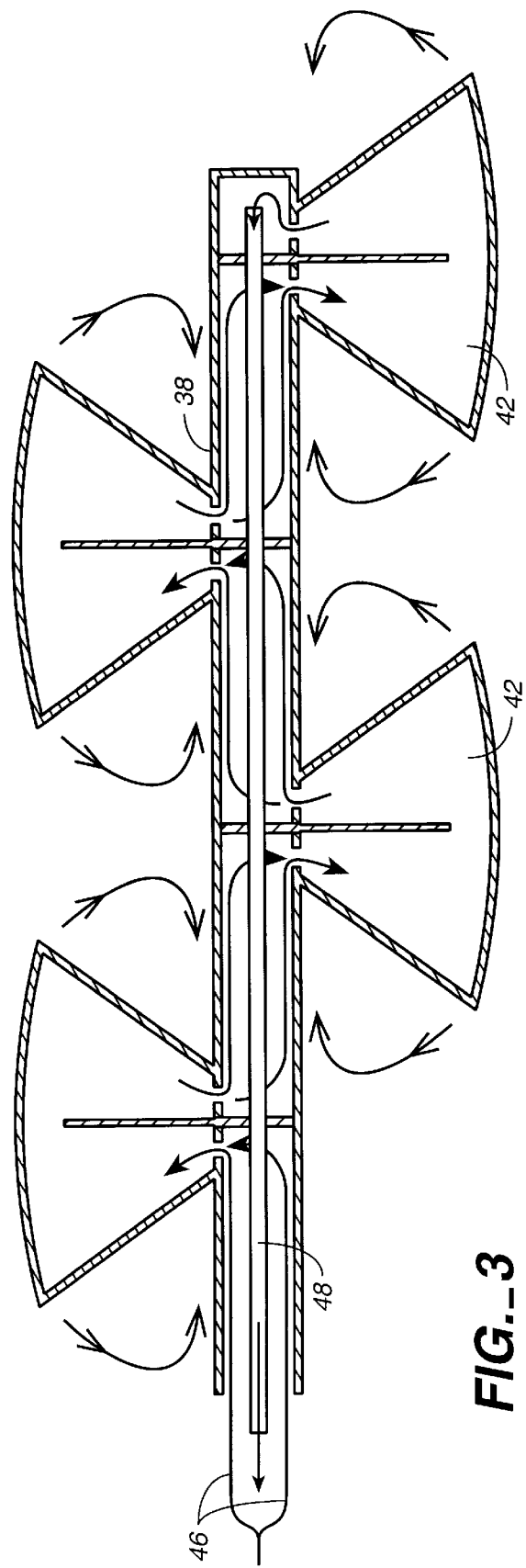
FIG._3

APPARATUS FOR MARINATING MEAT PRODUCTS

This application claims the benefit of U.S. Ser. No. 60/095,183, filed Aug. 3, 1998.

BACKGROUND OF THE INVENTION

1. Field of the Invention

This invention relates to meat marinating machines, and more particularly to a refrigerated cylindrical drum paddle-agitator mixer operated under a vacuum.

2. Description of the Prior Art

Methods and devices for marinating meat are many and varied. Early methods of deep marination include the injection of liquid via syringe. Advances over this method included the technique of massaging (or tumbling) meat under vacuum while exposing it to liquid marinade. In a vacuum, meat expands significantly and air may be extracted; the marinade then fills the interstices of the tissue in the hope that it will largely remain in place after the product is restored to normal atmospheric pressure. For larger pieces of meat, a combination of injection and vacuum massaging may be used for even distribution of the marinade.

Ordinarily, liquid marinades for meat are water based and contain additives to produce one or more results, including tenderizing, preserving, macerating, and/or flavoring. In the meat processing and packing industry, the challenge has been to get the liquid additives into the meat, distribute it evenly, and then keep it in the meat during processing or packaging. The first two of these challenges is partly addressed with vacuum tumbling. For example, in the ham industry the most common marinating machine is a vacuum tumbler comprising a vacuum drum having internal vanes. The drum is mechanically rotated about its horizontal axis. During this rotation, the meat is tumbled over the moving vanes causing the liquid to be "massaged" into the meat. In the poultry industry either a single or twin agitator is used. The meat is loaded into a horizontally positioned drum having a horizontal agitator shaft with fixed paddles. Under vacuum conditions, the paddles are rotated through the product, which massages liquid into the meat while massaging air out of the meat.

Industrial meat tumblers operated under vacuum are known in the art. These devices are adapted to thoroughly, uniformly, and efficiently expose meat to marinade, tenderizer, preservative, and/or flavoring prior to processing and packaging. An illustrative device is disclosed in U.S. Pat. No. 4,958,410, which discloses a machine for meat treatment and maceration comprising a rotatable drum with a hood inlet and means for automatically loading and unloading product through the hood inlet. U.S. Pat. No. 5,514,030, discloses a vacuum tumbler having an evacuatable drum mounted for rotation around its longitudinal axis, the drum having an opening at one end for loading and an opening at the other for unloading, and means for conveying material through the drum from the loading end to unloading end. The drum further has means for sealing the ends of the drum around the end openings to enable continuous passage of product into and out of the drum.

The problem has been, and remains, that over 50 percent of the liquid marinade routinely purges out of the meat during processing of the meat or after packaging. This occurs regardless of whether the meat is cooked before packaging, and it results in a compromised effect of the additives; i.e., reduced flavor, reduced longevity, and an unattractive appearance. Purging is particularly problematic when meat is cooked before packaging. Even vacuum massaged products lose most of the marinade introduced into the meat during processing.

In many existing marinating devices, the mechanical action of agitators and/or vanes imparts heat to the product, and heat causes liquid to purge out of the product after processing. It is not at all uncommon for the temperature of ham, which requires a lengthy four-to-five hour massaging cycle, to rise 12°–15° F. Poultry has a substantially shorter mechanical marinating cycle—only one half hour, typically—but still rises 2°–3° F.

A proposed solution to the problem of heat was advanced in the ham industry. It was discovered that when ham products are massaged at a temperature close to that of the freezing point of the marinade, the liquid became more stable in the meat matrix and purged in a lesser amount after processing. Thus, vacuum chilling became the accepted practice in the ham industry. The devices typically comprise a tumbling drum having a jacket through which refrigerant is circulated during the massage cycle. The meat product can be chilled to offset any mechanically induced heating.

Examples of combination vacuum chilling and tumbling devices, such as is described above, include U.S. Pat. No. 4,942,053, which teaches a vacuum chilling process for processing meat. U.S. Pat. No. 5,104,232, having a common inventor with the instant invention, teaches a vacuum tumble food mixer operable under vacuum conditions and having a chilling system. The disclosed device comprises a rotatable drum and a motor for rotating the same, and further includes vanes having a helical pitch for conveying product along the length of the drum from input to discharge openings. More recently, U.S. Pat. No. 5,564,332 discloses a massaging machine having a refrigerated processing tank and inlet and outlet chutes located at the same end of the tank. Paddles urge loaded meats away from the inlet chute and, when reversed, urge the meat towards the outlet chute.

While the principle of vacuum chilling and tumbling works well in practice in the ham industry, there is no similarly effective machine available for machine marinating poultry. For example, U.S. Pat. No. 5,564,332, described above, has insufficient heat exchange area per volume to chill certain meat products, most notably poultry, quickly enough for efficient processing. Because poultry massaging lasts only 20 to 25 minutes, there is not enough time for sufficient heat transfer to take place to reduce the temperature of the poultry product and thereby stabilize liquid marinade in the meat matrix. Therefore, there exists a need for a vacuum meat marinating machine adapted for use with products requiring a short vacuum massage cycle.

SUMMARY OF THE INVENTION

The present invention is an improved vacuum meat marinating machine for products requiring a short vacuum massage cycle. The machine is comprised of a substantially horizontal vessel having a substantially cylindrical inferior portion and a substantially cuboid superior portion, thereby giving the vessel a keyhole profile when viewed on end. In a preferred embodiment, the entire top of the vessel opens for rapid loading of product. When in operation, the top opening is sealed by a motorized vacuum cover. The outer wall of the vessel is a hollow jacket through which refrigerant flows during operation.

A paddle agitator is located within the vessel. The agitator rotates about a motorized reversible shaft positioned along the longitudinal axis of the substantially cylindrical portion of the vessel. Affixed to the shaft are a plurality of triangular shaped paddles. The paddles are angled so that product is pushed horizontally along the length of the vessel as the agitator shaft rotates. Reversal of shaft rotation causes the product to reverse direction as well. Movements in either direction massage air out of the product.

As noted, the outer wall of the vessel is a hollow jacket for circulation of refrigerant. Among others, refrigerants suitable for use with the present invention include glycol and $CO_2$. The paddle agitator provides an additional source of heat exchange. The agitator shaft and each of the paddles are hollow and include a constellation of vents that enable controlled circulation of refrigerant throughout the agitator from one end to the other. As a result, in operation all agitator surfaces are chilled, as is the inside wall of the vessel. In operation, rotation of the agitator contributes to the chilling of product. Periodic and routine reversal of agitator direction increases chilling efficiency because mechanically induced heat production is reduced and heat exchange between product and refrigerant is maximized. As a result, product is chilled at an extremely rapid rate.

Relative dimensions of the vessel also maximize heat exchange for a vessel of any capacity. Specifically, the preferred ratio of vessel length to vessel and agitator diameter is greater than 2:1. To ensure adequate end-to-end mixing and to equilibrate product temperature, the maximum length-to-diameter ratio is 3:1.

BRIEF DESCRIPTION OF THE DRAWINGS

FIG. 1 is a side elevation view of the meat marinating machine of the present invention, showing the agitator and affixed paddles in phantom.

FIG. 2 is an end view of the machine of FIG. 1, viewed from the discharge end and showing the jacket for refrigerant in phantom.

FIG. 3 is side elevation cross-sectional view showing details of the horizontal hollow agitator shaft and affixed hollow paddles of the present invention.

DETAILED DESCRIPTION OF A PREFERRED EMBODIMENT

As shown in FIGS. 1 and 2, the meat marinating machine of the present invention, generally denominated 10, comprises a generally horizontal vessel 12 having a first end 14 and a second, discharge end 16, a substantially cylindrical inferior portion 18 and a substantially cuboid superior portion 20, thereby giving a keyhole profile when viewed on end (see FIG. 2). The vessel is supported on a base or frame structure 22. A rectangular opening 24 runs the entire length of the superior portion of the vessel for rapid loading, the opening covered by a motorized sealed vacuum cover 26 when in operation.

The outer wall 28 of the cylindrical portion of the vessel comprises a hollow jacket 30, through which refrigerant may be circulated during operation. Preferably the jacket has a baffling system (not shown) for control of the flow of refrigerated liquid. In operation, the interior chamber of the vessel 32 is filled no higher than the upper border 34 of the cylindrical portion of the vessel, amounting to roughly 75 percent of the total vessel volume.

Positioned within the interior chamber of the vessel are means to massage meat product in the liquid marinade solution. Preferably the agitator is a paddle agitator 36 having a horizontal hollow agitator shaft 38 rotatably mounted through support bearings 40 located at the approximate longitudinal axis of the cylindrical portion at each of the ends of the vessel. Affixed to the agitator shaft are a plurality of hollow paddles 42, preferably substantially triangular in shape, and preferably angled to comprise an internal screw drive. The triangular shape further ensures continuous coverage of the outer wall of the cylindrical portion while leaving a relatively open area proximate the agitator shaft for easy flow of product slurry. The agitator shaft is driven by a reversible motorized drive system 44, which rotates the agitator in either direction about its horizontal axis. The hollow agitator shaft is connected to source of coolant (not shown).

Acceptable alternative agitator designs comprise, for example, a spiral hollow ribbon agitators with hollow spokes, the ribbon having a wide profile and spokes sufficiently flat so for an adequate total heat transfer area. Another acceptable agitator might be a screw auger having either continuous or intermittent flights, some or all of which may be hollow for the circulation of refrigerant. This kind of agitator provides a very large heat exchange area and suffers only the drawback of having correspondingly large shear areas. Yet another acceptable agitator is a spoke agitator, as is often used in the ham industry. The spokes can be made hollow for circulation of refrigerant and expansion of the total heat exchange area.

FIG. 3 is a side elevation cross-sectional view showing details of the preferred agitator of the present invention, namely a horizontal hollow agitator shaft having affixed radially projecting hollow paddles. As shown in FIG. 3, when the paddles 42 are affixed to the shaft 38, a constellation of unbroken contiguous openings is formed enabling the unidirectional circulation of coolant throughout the agitator from one end to the other in a serpentine flow pattern 46. The coolant is discharged through an interior hollow shaft 48 having a longitudinal axis concentric with that of the horizontal hollow agitator shaft.

The motorized drive system 44 and coolant source are preferably located at the first end 14. A vacuum sealed motorized discharge door 50 is preferably located at the is discharge end 16. Vacuum conditions for the processing cycle are created through vacuum pumps 52.

To maximize the heat exchange areas of the machine, to ensure adequate end-to-end mixing of the product, and to equilibrate product temperature, the preferred relative length to diameter dimensions of the vessel are between 2:1 and 3:1.

In operation, the products to be processed—typically meat products along with phosphates, salts, flavorings, proteins, binders, tenderizers, and other meat additives—are loaded into the vessel 12 through opening 24. The vacuum cover 26 is closed and sealed and air is extracted by vacuum pumps (not shown) until a vacuum is formed. As previously noted, the vessel is filled no higher than the superior border 34 of the cylindrical portion 18 of the vessel. This is to ensure that product is cooled throughout processing.

Next, the meat products and additives are tumbled by rotation of the agitator 36 by reversible motorized drive system 44. Concurrently, coolant is circulated throughout the vessel's hollow jacket 30 and the agitator shaft 38 and paddles 42. When the paddles 42 are angled as is preferred, rotation of the agitator in one direction pushed product up and over the paddles while simultaneously pushing the product lengthwise inside the vessel. Movement of the agitator through the product causes a massaging action that works out air from the product. The drive system 44 of the agitator is preferably designed to automatically reverse the direction of rotation.

When the processing is complete, the vacuum is released, the vacuum cover 26 is opened, and the motorized vacuum sealed discharge door 50 is opened. The agitator may be manually controlled so that the screw drive effect of the paddles pushes product out the discharge door opening.

Combined, the hollow vessel jacket 30, agitator shaft 38 and paddles 42, along with the indicated design dimensions, provide an extremely high surface area for heat transfer for rapid chilling of product during a short massage cycle. Glycol has a temperature 10° to 12° F. below the freezing point of water-based marinades. When it is circulated through the hollow jacket, agitator shaft and paddles during processing, the heat energy put into the product through mechanical action is offset. Additionally, the temperature of the product may be reduced up to 10° below its temperature at the time it was put into the vessel. Empirically this temperature drop has been shown in as little as 20 to 25 minutes, or the typical poultry massage cycle time. However, the instant invention has been demonstrated to be superior to existing massagers for a variety of meat products. For example in the shrimp industry, shrimp is usually loaded at approximately 60° F. Beginning at this temperature, the instant invention removes 20–26° F. in the 20–25 minute massage cycle for this product. Even though the shrimp is not taken to the freezing point, yield is nonetheless superior to existing massagers by roughly 6–8 percent, representing significant savings to the user.

During the rotation of the agitator in one direction, heat transfer is more efficient on the leading surface of the paddles than in the following surface. This is because product flows over the surface of the paddle in a smooth compressed flow due to the angle of the paddle. This compressed flow sweeps away the boundary layer of marinating liquid which insulates the surface. With the boundary layer removed, the leading surface is more efficient in transferring heat energy from the product into the refrigerated liquid inside the paddle. The turbulent flow on the following surface of the paddle allows the insulating boundary layer to remain in place, thus insulating the paddle surface on this side.

The more efficient heat transfer of the product on the leading surface causes the paddle to warm slightly. As the paddle surface warms, the temperature differential between the product and the paddle is reduced, thereby reducing efficiency. The less effective heat transfer on the following surface results in the surface of the paddle cooling relative to the leading surface. Therefore, when the agitator changes direction, there is an instantaneous improvement in heat transfer as product flows over the colder surface.

Alternating the direction of rotation of the agitator results in increased chilling efficiency over that achieved by an agitator rotating in only one direction, regardless of the temperature of refrigerated liquid circulated through the hollow jacket, agitator shaft and paddles. Test have shown that the more frequently the agitator is reversed, the more effective the cooling. However, it is impracticable to change directions more often than every ten seconds. The maximum the agitator should run in one direction is approximately two minutes.

The agitator control system may be designed to slow agitator rotation as the temperature of the product drops. When products cool, they become increasingly stiff, unyielding, and vulnerable to damage. The agitator control system of the present invention preferably includes a variable speed drive and a programmable logic circuit that senses product temperature and slows agitator speed as product cools. Accordingly, optimum agitator speed may be maintained throughout the massage cycle.

The meat marinating machine disclosed herein is significantly more efficient in massaging and chilling than currently used devices. By chilling the product close to the freezing point, and by doing so more quickly under vacuum conditions while massaging marinade into the meat, the liquid marinade is tightly locked into the meat structure even during cooking. The result is a juicier more flavorful product.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A meat marinating apparatus comprising:
   a generally horizontal vessel having an interior chamber, a sealed end, a discharge end having a discharge opening, a hollow outer wall forming a jacket for the circulation of liquid refrigerant during operation, and an opening at the top of said vessel;
   a vacuum sealed discharge door at said discharge end of said vessel so that a full vacuum can be created inside said vessel when in operation;
   a sealed vacuum cover for covering said opening at the top of said vessel so that a full vacuum can be created inside said vessel when in operation;
   a base for supporting said vessel;
   massaging means for mixing and massaging marinating solution into meat product, said massaging means having refrigerated surface areas for cooling meat products when in operation.

2. The meat marinating machine of claim 1 wherein said massaging means comprises a rotatable paddle agitator rotatably mounted within the interior chamber of said vessel, said agitator having a horizontal hollow agitator shaft, an inlet port for introduction of liquid refrigerant, an outlet port for discharge of said refrigerant, a plurality of hollow paddles, said paddles radially affixed to said hollow agitator shaft in such a manner as to form a continuous unbroken series of channels for directing and controlling the unidirectional flow of liquid refrigerant through said hollow agitator shaft and said paddles, and means for introducing liquid refrigerant into said inlet port of said hollow agitator shaft and said hollow outer wall of said vessel.

3. The meat marinating machine of claim 1 further including means for rotating said agitator in either direction about its horizontal axis when in operation.

4. The meat marinating machine of claim 1 wherein said vessel has a substantially cylindrical inferior portion and a substantially cuboid superior portion.

5. The meat marinating machine of claim 4 wherein said cuboid portion has an opening running substantially the entire length at its top.

6. The meat marinating machine of claim 5 further including a sealed vacuum cover for covering said opening when the machine is in operation.

7. The meat marinating machine of claim 4 wherein said cylindrical inferior portion has relative length-to-diameter dimensions of between 2:1 to 3:1.

8. The meat marinating machine of claim 1 wherein said paddles are affixed to said agitator shaft at an angle so as to create a screw drive for pushing product in a horizontal direction within said vessel during operation.

9. The meat marinating machine of claim 1 wherein said paddles are substantially triangular in shape.

10. The meat marinating machine of claim 1 wherein said means for rotating said agitator is a motorized drive system connected to said hollow horizontal shaft of said paddle agitator.

11. The meat marinating machine of claim 10 wherein said motorized drive system is reversible and may be programmed to periodically alternate the direction of rotation of said paddle agitator.

12. The meat marinating machine of claim 1 further including an agitator control system which slows said motorized drive system and agitator rotation as the temperature of meat product cools during operation.

13. The meat marination machine of claim 1 wherein said agitator control system includes a variable speed drive and a programmable logic circuit that senses product temperature and slows agitator speed as product cools.

14. The meat marinating machine of claim 1 wherein said sealed vacuum cover is motorized.

15. The meat marinating machine of claim 1 wherein said vacuum sealed discharge door is motorized.

16. A meat marinating apparatus comprising:
- a generally horizontal vessel having an interior chamber, a sealed end, a discharge end, a substantially cylindrical inferior portion having a hollow outer wall with an integral baffle system for controlled circulation of refrigerant and a substantially cuboid superior portion thereby giving a keyhole profile when viewed on end, an opening at the top of said superior portion for loading of product, and an opening at said discharge end for removal of product;
- a sealed vacuum cover for covering said opening at the top of said superior portion of said vessel so that a full vacuum can be created when in operation;
- a vacuum sealed discharge door at said discharge end of said vessel so that a full vacuum can be created during operation;
- a base for supporting said vessel;
- a rotatable paddle agitator positioned within the interior chamber of said vessel, said agitator having a horizontal hollow agitator shaft rotatably mounted through support bearings located at the approximate longitudinal axis of the cylindrical portion of said vessel at each of the ends of the vessel, an inlet port for introduction of liquid refrigerant into said hollow agitator shaft, and an outlet port for discharge of said refrigerant;
- a plurality of hollow paddles, said paddles affixed to said hollow agitator shaft in such a manner as to form a continuous unbroken series of channels for directing and controlling the unidirectional flow of liquid refrigerant through said hollow agitator shaft and said paddles;
- a reversible motorized drive system connected to said hollow horizontal shaft of said paddle agitator, said drive system alternately rotating the agitator in either direction about its horizontal axis when in operation;
- means for introducing liquid refrigerant into said hollow agitator shaft; and
- means for introducing liquid refrigerant into said hollow outer wall of said vessel; and
- a vacuum pump for evacuating air from said vessel during operation.

17. The meat marinating machine of claim 16 wherein said opening at said top of said cuboid portion of said vessel runs substantially the entire length of said top.

18. The meat marinating machine of claim 16 wherein said cylindrical inferior portion has relative length-to-diameter dimensions of between 2:1 to 3:1.

19. The meat marinating machine of claim 16 wherein said paddles are affixed to said agitator shaft at an angle so as to create a screw drive for pushing product in a horizontal direction within said vessel during operation.

20. The meat marinating machine of claim 16 wherein said motorized drive system may be programmed to periodically alternate the direction of rotation of said paddle agitator.

* * * * *